US009722488B2

United States Patent
Ishizeki et al.

(10) Patent No.: US 9,722,488 B2
(45) Date of Patent: Aug. 1, 2017

(54) POWER CONVERTER AND AIR CONDITIONER

(71) Applicant: DAIKIN INDUSTRIES, LTD., Osaka-shi, Osaka (JP)

(72) Inventors: Shinichi Ishizeki, Osaka (JP); Kentarou Taoka, Osaka (JP); Masahide Fujiwara, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/026,880

(22) PCT Filed: Aug. 27, 2014

(86) PCT No.: PCT/JP2014/004394
§ 371 (c)(1),
(2) Date: Apr. 1, 2016

(87) PCT Pub. No.: WO2015/056388
PCT Pub. Date: Apr. 23, 2015

(65) Prior Publication Data
US 2016/0248318 A1    Aug. 25, 2016

(30) Foreign Application Priority Data
Oct. 16, 2013  (JP) .................................. 2013-215231

(51) Int. Cl.
*H02P 27/08*    (2006.01)
*H02M 1/42*    (2007.01)
(Continued)

(52) U.S. Cl.
CPC ........... *H02M 1/4225* (2013.01); *H02M 1/14* (2013.01); *H02M 5/458* (2013.01); *H02P 27/08* (2013.01);
(Continued)

(58) Field of Classification Search
CPC ....................................................... H02P 27/08
(Continued)

(56) References Cited

U.S. PATENT DOCUMENTS 7,221,121 B2 *   5/2007   Skaug .................... F04C 28/08
                                                            318/727
8,169,180 B2 *   5/2012   Hwang ................ F24F 11/0009
                                                            318/400.01
(Continued)

FOREIGN PATENT DOCUMENTS

JP     2003-079050 A    3/2003
JP     2005-039925 A    2/2005
(Continued)

OTHER PUBLICATIONS

International Search Report issued in PCT/JP2014/004394, dated Dec. 2, 2014.

*Primary Examiner* — David S Luo
(74) *Attorney, Agent, or Firm* — Birch, Stewart, Kolasch & Birch, LLP (57) ABSTRACT

Disclosed herein is a technique for substantially preventing, in a power converter including a boost power factor correction section, the power factor correction section from starting an intermittent operation even if the ripple voltage of its smoothing capacitor has increased. The converter includes: a power factor correction section including a booster circuit boosting an input voltage supplied from a rectifier section and a smoothing capacitor smoothing an output of the booster circuit; and a control section correcting a power factor by controlling the booster circuit. The control section makes correction to the amount of boost of the booster circuit such that an output voltage of the smoothing capacitor does not become lower than the input voltage.

20 Claims, 6 Drawing Sheets

(51) Int. Cl.
*H02M 1/14* (2006.01)
*H02M 5/458* (2006.01)
H02M 5/45 (2006.01)
H02M 3/158 (2006.01)
F24F 11/00 (2006.01)

(52) U.S. Cl.
CPC ........ *F24F 2011/0083* (2013.01); *H02M 5/45* (2013.01); *H02M 2003/1586* (2013.01); *Y02B 70/126* (2013.01)

(58) Field of Classification Search
USPC ............................... 318/400.26, 400.01, 700
IPC ....................................................... H02P 27/08
See application file for complete search history.

(56) References Cited

U.S. PATENT DOCUMENTS

| | | | |
|---|---|---|---|
| 8,525,468 B2* | 9/2013 | Winterhalter | H02P 27/06 318/798 |
| 2005/0269999 A1 | 12/2005 | Liu et al. | |
| 2009/0016087 A1 | 1/2009 | Shimizu | |
| 2010/0110738 A1 | 5/2010 | Shimizu | |

FOREIGN PATENT DOCUMENTS

| | | |
|---|---|---|
| JP | 2010-263775 A | 11/2010 |
| JP | 2011-239547 A | 11/2011 |
| JP | 2012-130143 A | 7/2012 |
| JP | 2012-226917 A | 11/2012 |
| JP | 5157574 A | 3/2013 |
| JP | 2013-85319 A | 5/2013 |
| KR | 10-2011-0014435 A | 2/2011 |

* cited by examiner

POWER CONVERTER AND AIR CONDITIONER

TECHNICAL FIELD

The present invention relates to a power converter with a boost power factor correction section and an air conditioner including such a power converter, and more particularly relates to a technique for stabilizing power factor correction done by the power factor correction section.

BACKGROUND ART

An air conditioner is provided with a compressor, which is driven by a motor functioning as a driving source. The motor drives the load by being supplied with AC power from a power converter device.

As disclosed in Patent Document 1, for example, a known power converter device is generally comprised of a rectifier section, a boost power factor correction section, and an inverter power converter section as its main components. First of all, an AC commercial voltage output from a commercial power supply is rectified by the rectifier section. The rectified voltage is boosted to any desired voltage, and then smoothed, by the power factor correction section so as to have its power factor corrected. After the power factor has been corrected, the voltage is supplied to the power converter section, which generates an AC power to drive a motor using the voltage that had had its power factor corrected, and outputs the power to the motor.

CITATION LIST

Patent Document

PATENT DOCUMENT 1: Japanese Unexamined Patent Publication No. 2011-239547

SUMMARY OF INVENTION

Technical Problem

However, if a smoothing capacitor provided to precede the inverter circuit deteriorates or if the load placed on the inverter circuit increases more than expected, for example, then the ripple (i.e., ripple voltage) of the output voltage of the smoothing capacitor increases so much that the peak value of the output of the rectifier section becomes greater than the bottom value of the output voltage of an electrolytic capacitor. As a result, the power factor correction section may temporarily stop its voltage boosting operation, and may eventually start an intermittent operation. If the power factor correction section performs such an intermittent operation, the harmonic components of a power supply current may increase, the power factor may be corrected insufficiently, or a large amount of transient current may flow through switching elements (configured as IGBTs, for example) forming parts of the power factor correction section. This problem could be overcome by increasing the capacitance of elements (such as reactors and IGBTs) forming the power factor correction section and the electrolytic capacitor. Such a measure is not recommended because the overall size and cost of the device would increase if that measure were adopted.

In view of the foregoing background, it is therefore an object of the present invention to substantially prevent, in a power converter including a boost power factor correction section, the power factor correction section from starting such an intermittent operation even if the ripple voltage of its smoothing capacitor has increased.

Solution to the Problem

To overcome the problem described above, a first aspect provides a power converter comprising:

a rectifier section (22) configured to rectify an incoming alternating current that has come from an AC power supply (91);

a power factor correction section (25) including a booster circuit (25a) configured to have a variable amount of boost and to boost an input voltage (V1) supplied from the rectifier section (22) and a smoothing capacitor (26) configured to smooth an output of the booster circuit (25a);

a power converter section (28) connected to an output of the power factor correction section (25) and generating an output AC power; and a control section (30, 31) configured to correct a power factor by controlling the booster circuit (25a), wherein the control section (30, 31) makes correction to the amount of boost of the booster circuit (25a) such that an output voltage (V2) of the smoothing capacitor (26) does not become lower than the input voltage (V1).

According to this configuration, control is performed by correcting the amount of boost of the booster circuit (25a) such that the output voltage (V2) of the smoothing capacitor (26) does not become lower than the input voltage (V1).

A second aspect is an embodiment of the first aspect.

In the second aspect, the control section (30, 31) makes the correction if the output voltage (V2) of the smoothing capacitor (26) has a ripple exceeding a predetermined threshold value (C_Vripple_Dat).

According to this configuration, a determination is made, based on only the magnitude of the ripple of the output voltage (V2) of the smoothing capacitor (26), whether or not the correction needs to be made.

A third aspect is an embodiment of the second aspect.

In the third aspect, the power converter includes an output voltage detecting section (27) configured to detect the output voltage (V2), and the control section (30, 31) makes the correction if the output voltage (V2) has an amplitude exceeding the threshold value (C_Vripple_Dat).

According to this configuration, the amplitude of the output voltage (V2) of the smoothing capacitor (26) is detected, and a determination is made, based on the amplitude, whether or not the correction needs to be made.

A fourth aspect is an embodiment of the first aspect.

In the fourth aspect, the power converter includes:

an input voltage detecting section (24) configured to detect a peak value (V11) of the input voltage (V1); and an output voltage detecting section (27) configured to detect the output voltage (V2), and the control section (30, 31) makes the correction such that a bottom voltage (Vdc) detected by the output voltage detecting section (27) does not become lower than a voltage (Vac_peak) detected by the input voltage detecting section (24).

According to this configuration, the peak value (V11) of the input voltage (V1) is compared to the output voltage (V2) of the smoothing capacitor (26), and a determination is made, based on a result of the comparison, whether or not the correction needs to be made.

A fifth aspect is an embodiment of any one of the first to fourth aspects.

In the fifth aspect, the control section (30, 31) decreases the amount of boost if the amplitude of the ripple of the output voltage (V2) of the smoothing capacitor (26) becomes smaller than a predetermined threshold value (C_Vripple_Rel) after the correction has been made.

According to this configuration, the amount of boost is decreased once the amount of boost no longer needs to be corrected.

A sixth aspect is an embodiment of any one of the first to fifth aspects.

In the sixth aspect, the control section (30, 31) increases the amount of boost of the booster circuit (25a) stepwise such that the output voltage (V2) of the smoothing capacitor (26) does not become lower than the input voltage (V1).

According to this configuration, the magnitude of correction may be increased gradually.

A seventh aspect provides an air conditioner including a power converter according to any one of the first to sixth aspects.

According to this configuration, the amount of boost is corrected as described above in an air conditioner including the power converter described above.

Advantages of the Invention

According to the first aspect, the power factor correction section may be prevented from starting the intermittent operation even if the ripple voltage of the smoothing capacitor has increased.

In addition, the second and third aspects facilitate determining whether or not the correction needs to be made.

Moreover, the fourth aspect ensures that the correction is made with reliability even if the input voltage (V1) varies.

Besides, according to the fifth aspect, the amount of boost may be prevented from increasing unnecessarily, and therefore, the loss to be caused by the power converter may be cut down.

Furthermore, according to the sixth aspect, the amount of boost may be prevented from increasing unnecessarily because the magnitude of correction is increased stepwise, and therefore, the loss to be caused by the power converter may be cut down.

Meanwhile, the seventh aspect allows an air conditioner to achieve all of these advantages of the first to sixth aspects.

DESCRIPTION OF EMBODIMENTS

Embodiments of the present invention will now be described with reference to the accompanying drawings. Note that the embodiments to be described below are merely preferred examples in nature, and are not intended to limit the scope of the present invention, its applications, or its use.

First Embodiment of this Invention

Overview

Figure 1:
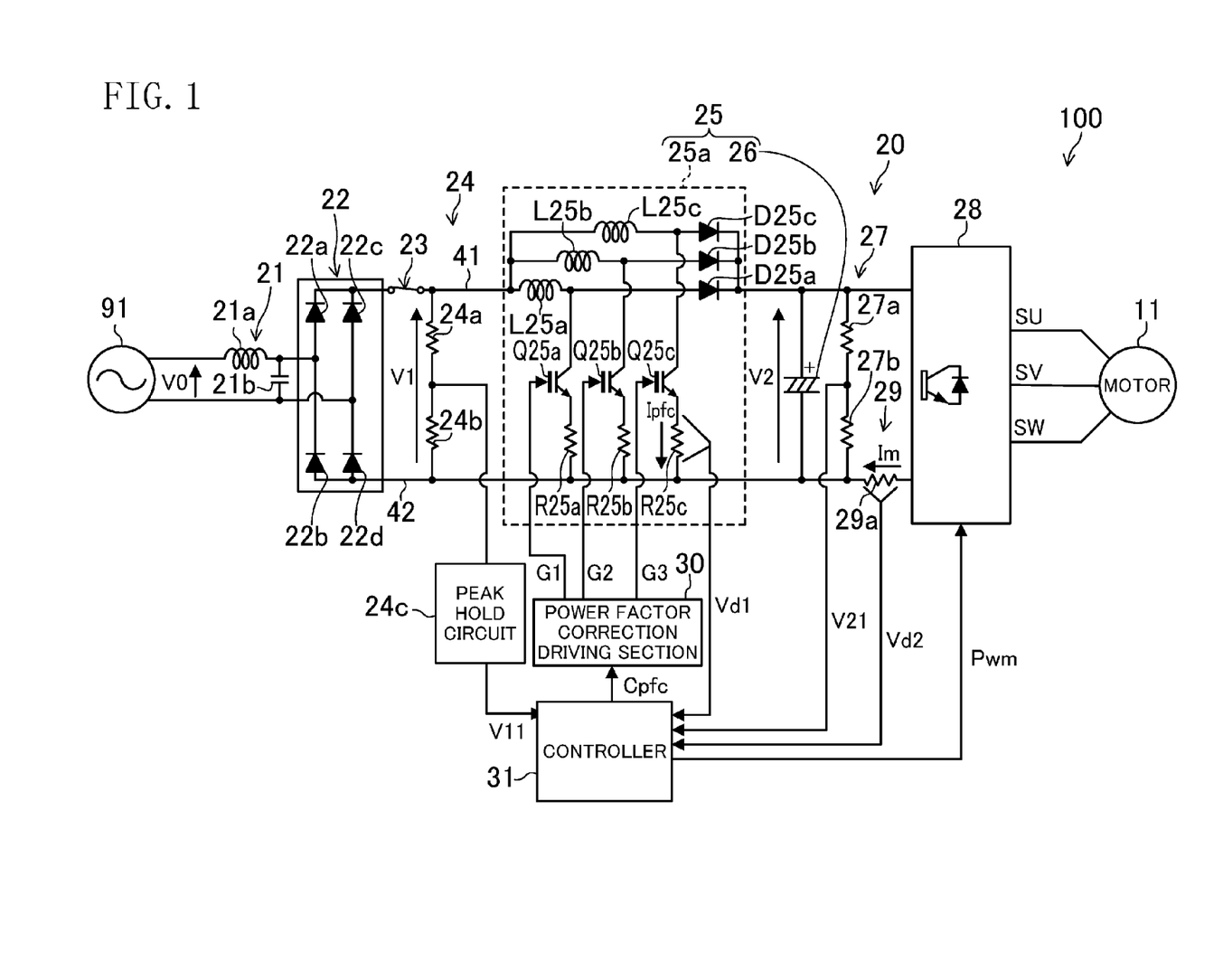
FIG. 1 illustrates a configuration for a motor driving system including a power converter according to a first embodiment of the present invention.

FIG. 1 illustrates a configuration for a motor driving system (100) including a power converter (20) according to a first embodiment of the present invention. The motor driving system (100) shown in FIG. 1 is comprised of a motor (11) and a power converter (20).

The motor (11) is a three-phase brushless DC motor, and includes a stator, a rotor, a Hall element, and other members (not shown). The stator includes a plurality of drive coils. The rotor includes a plurality of permanent magnets. The Hall element is configured to detect the position of the rotor relative to the stator.

Figure 2:
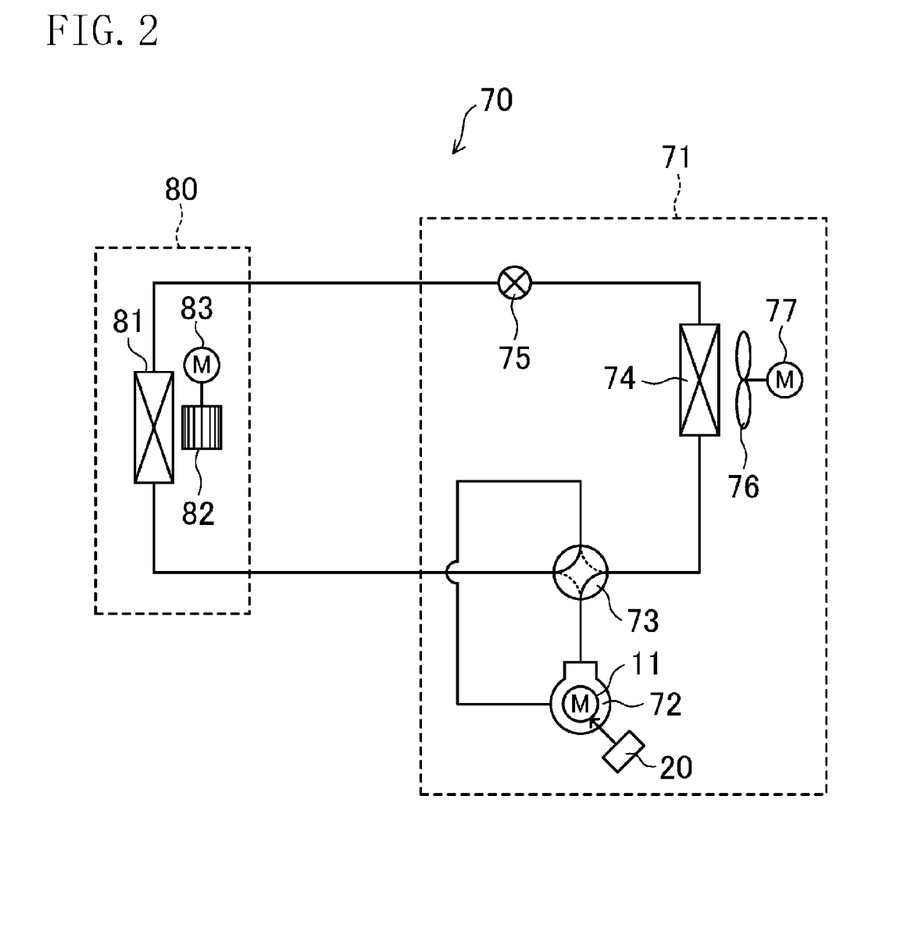
FIG. 2 illustrates a general configuration for an air conditioner.

Note that the motor (11) of this first embodiment is used as a driving source for a compressor (72) included in the air conditioner (70) shown in FIG. 2, which illustrates a general configuration for the air conditioner (70). As shown in FIG. 2, its outdoor unit (71) includes not only the compressor (72) that compresses a refrigerant and the motor (11), but also a four-way switching valve (73) that changes the flow of the refrigerant, an outdoor heat exchanger (74) that exchanges heat between outdoor air and the refrigerant, an expansion valve (75) that reduces the pressure of the refrigerant, an outdoor fan (76) that supplies the outdoor air to the outdoor heat exchanger (74), and a fan motor (77). On the other hand, its indoor unit (80) includes an indoor heat exchanger (81) that exchanges heat between indoor air and the refrigerant, an indoor fan (82) that blows out the heat-exchanged air into the indoor space, and a fan motor (83).

The power converter (20) is connected to a commercial power supply (91) and the motor (11) via a number of harnesses. The power converter (20) converts an incoming alternating current supplied from the commercial power supply (91) as an AC power supply into an output AC power (SU, SV, SW) and supplies the AC power to the motor (11). In this manner, the motor (11) may be driven.

Note that in the first exemplary embodiment to be described below, the commercial power supply (91) is supposed to be a single-phase power supply as an example.

<Configuration for Power Converter>

The power converter (20) includes, as its main components, a filter (21), a rectifier section (22), a mains power supply relay (23), an input voltage detecting section (24), a power factor correction section (25), an output voltage detecting section (27), a power converting section (28), a current detecting section (29), a power factor correction driving section (30), and a controller (31).

—Filter—

The filter (21) is provided between the commercial power supply (91) and the rectifier section (22). The filter (21) is a low-pass filter comprised of a coil (21a) and a capacitor (21b), and prevents harmonic noise, generated in the power factor correction section (25) and the power converting section (28), from entering the commercial power supply (19) and its surrounding components.

—Rectifier Section—

The rectifier section (22) is connected to the filter (21) so as to follow the filter (21). The rectifier section (22) is comprised of four diodes (22a, 22b, 22c, 22d).

Specifically, the respective cathode terminals of the diodes (22a, 22c) are both connected to a power line (41). The respective anode terminals of the diodes (22b, 22d) are both connected to a GND line (42). A point of connection between the anode terminal of the diode (22a) and the cathode terminal of the diode (22b) and a point of connection between the anode terminal of the diode (22c) and the cathode terminal of the diode (22d) are both connected to the outputs of the commercial power supply (91).

Figure 3:
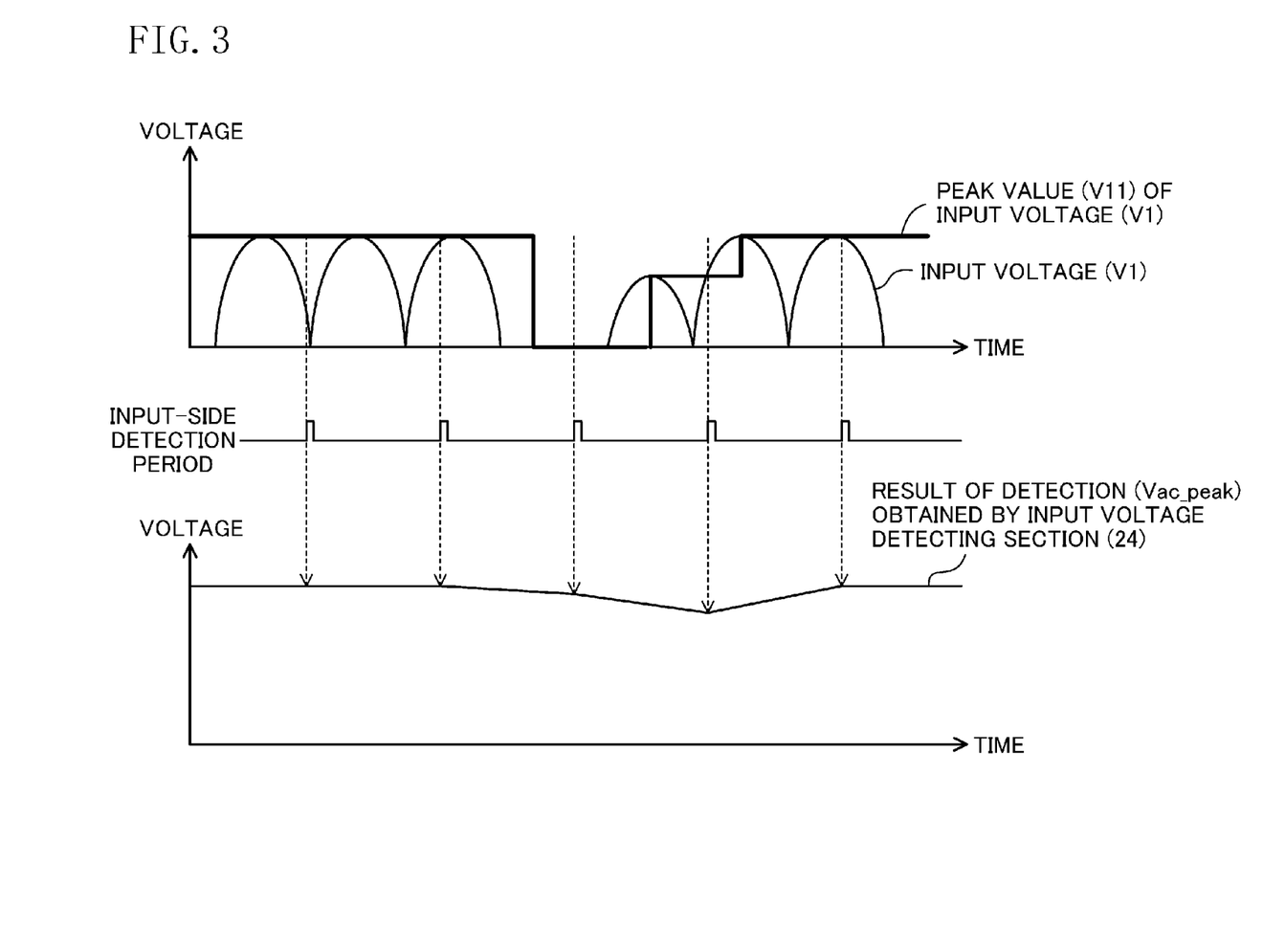
FIG. 3 is a timing chart showing how an input voltage, its peak value, an input-side detection period, and a result of detection obtained by an input voltage detecting section change with time.

The rectifier section (22) subjects an incoming alternating current that has come from the commercial power supply (91) to a full-wave rectification and then outputs the rectified current as shown in FIG. 3. FIG. 3 shows how the rectified voltage (hereinafter referred to as an "input voltage (V1)"), the peak value (V11) of the input voltage (V1), an input-side detection period (to be described later), and a result of detection (Vac_peak) obtained by the input voltage detecting section (24) change with time.

In the following description, the voltage of the incoming alternating current will be hereinafter referred to as a "commercial voltage (V0)" for convenience sake.

—Mains Power Supply Relay—

The mains power supply relay (23) is connected in series to the power line (41) between the rectifier section (22) and the power factor correction section (25). The mains power supply relay (23) is a normally closed contact. When the motor (11) being driven needs to be brought to an emergency stop, for example, the mains power supply relay (23) is opened, thereby cutting off the supply of power from the commercial power supply (91) toward the motor (11).

The motor (11) being driven may need to be brought to an emergency stop, for example, when a high pressure abnormality arises in the compressor (72) and when an excessive amount of current flows through the motor (11).

Note that the mains power supply relay (23) does not have to be arranged to follow the rectifier section (22) but may also be arranged to precede the rectifier section (22) instead.

—Input Voltage Detecting Section—

The input voltage detecting section (24) detects the output voltage (V1) of the rectifier section (22) as an input voltage for the power factor correction section (25).

Figure 4:
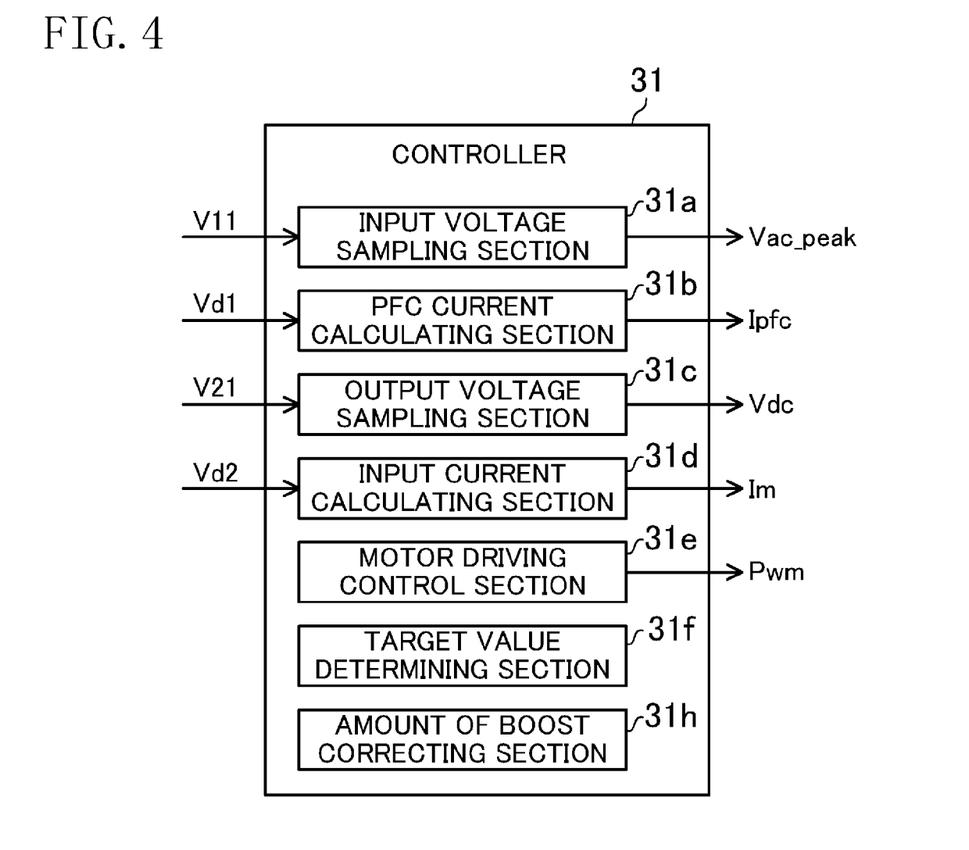
FIG. 4 schematically illustrates respective functional sections of a controller according to the first embodiment.

Specifically, as shown in FIGS. 1 and 4, the input voltage detecting section (24) includes, as its main components, two resistors (24a, 24b) which are connected together in series, a peak hold circuit (24c), and a controller (31) functioning as an input voltage sampling section (31a). The two resistors (24a, 24b) connected together in series are further connected to two output terminals of the rectifier section (22) between the mains power supply relay (23) and the power factor correction section (25). A voltage value at the point of connection between these two resistors (24a, 24b) themselves is input to the peak hold circuit (24c). The peak hold circuit (24c) maintains the peak value (V11), which is the maximum value of the input voltage (V1), for a certain period of time as shown in FIG. 3. This peak value (V11) is input to the controller (31), sampled and A/D converted by the input voltage sampling section (31a) at every input-side detection period as shown in FIG. 3, and recognized as a result of detection (Vac_peak).

In this respect, FIG. 4 schematically illustrates respective functional sections of the controller (31) according to the first embodiment.

Note that in the example illustrated in FIG. 3, one input-side detection period that is the detection period of the input voltage detecting section (24) is longer than one period at which the input voltage (V1) comes to have the maximum value (i.e., longer than the power supply frequency).

—Power Factor Correction Section—

As shown in FIG. 1, the power factor correction section (25) is provided in parallel with the rectifier section (22) with the mains power supply relay (23) interposed between them. The power factor correction section (25) is configured as a boost power factor corrector and performs a power factor correction operation by boosting and smoothing the input voltage (V1).

Specifically, the power factor correction section (25) according to the first embodiment includes a three-phase booster chopper circuit (25a) implemented to have a three-phase interleaved arrangement, and a single smoothing capacitor (26). Note that in FIG. 1, the reference numerals given to the booster chopper circuit (25a) correspond to only one phase. The booster chopper circuit (25a) is an exemplary booster circuit according to the present invention.

More specifically, the power factor correction section (25) includes three reactors (L25a, L25b, L25c), three switching elements (Q25a, Q25b, Q25c), three resistors (R25a, R25b, R25c), three diodes (D25a, D25b, D25c), and one smoothing capacitor (26).

The reactor (L25a) is connected in series to the power line (41) and plays the role of receiving the input voltage (V1) as electrical energy, transforming the electrical energy into magnetic flux energy, and storing the latter energy. The inductance value of the reactor (L25a) is determined appropriately based on the value of the current flowing through the power line (41), the switching frequency of the switching element (Q25a), and other factors.

The switching element (Q25a) is configured as an n-channel (Nch) insulated gate bipolar transistor, and connected in parallel with the reactor (L25a). The switching element (Q25a) plays the role of switching the states of the energy based on the input voltage (V1) such that the energy is selectively stored in, or discharged from, the reactor (L25a). The switching element (Q25a) has its ON and OFF states controlled by the power factor correction driving section (30).

The resistor (R25a) is configured as a shunt resistor to detect the current flowing through the switching element (Q25a) (which will be hereinafter referred to as a "PFC current (Ipfc)"), and is connected between the switching element (Q25a) and the GND line (42). The voltage (Vd1) between the two terminals of the resistor (R25a) is A/D converted, and then input to the controller (31) functioning as a PFC current calculating section (31b) (see FIG. 4), where the voltage is used to calculate the PFC current (Ipfc). The PFC current (Ipfc) is used to perform a driving control on the power factor correction section (25). This is done to ensure that stabilized energy is supplied to the stage following the power factor correction section (25) even if the output voltage (V2) has increased or decreased to a certain degree. The resistance value of the resistor (R25a) has been determined to be an appropriate value so as not to interfere with the voltage boosting operation by the power factor correction section (25).

Although only the voltage (Vd1) between the two terminals of the resistor (R25c) is indicated in FIG. 1 as being input to the controller (31), actually the voltage (Vd1)

between the two terminals of each of the other resistors (R25a, R25b) is also input to the controller (31).

The diode (D25a) is connected in series to the power line (41) on the output side of the reactor (L25a). More particularly, the anode terminal of the diode (D25a) is connected downstream of the point of connection between the reactor (L25a) and the switching element (Q25a) in the current flow direction. The diode (D25a) allows current to flow only from the reactor (L25a) toward the power converting section (28).

The smoothing capacitor (26) may be configured as an electrolytic capacitor, for example, and may be provided in common for the booster chopper circuit (25a) in respective phases. The smoothing capacitor (26) is connected in parallel with the respective switching elements (Q25a, Q25b, Q25c) on the output side of the respective reactors (L25a, L25b, L25c). The smoothing capacitor (26) is charged with the magnetic flux energy released from the respective reactors (L25a, L25b, L25c), and discharges the energy, thereby generating a DC voltage having a relatively low ripple component.

Now the boosting operation to be performed by such a power factor correction section (25) (i.e., a power factor correction operation) will be described by taking, as an example, the operation of a section of the booster chopper circuit (25a) for one phase. First, when the switching element (Q25a) turns ON, a current path leading from the power line (41) to the GND line (42) via the reactor (L25a), the switching element (Q25a), and the resistor (R25a) is formed, and the PFC current (Ipfc) flows through these elements in this order. Then, as the PFC current (Ipfc) flows through the reactor (L25a), magnetic energy is stored in the reactor (L25a). Next, when the switching element (Q25a) turns OFF, the current path is cut off by the switching element (Q25a). As a result, an amount of current corresponding to the energy stored in the reactor (L25a) flows into the smoothing capacitor (26) via the diode (D25a) to increase the voltage between the two terminals of the smoothing capacitor (26). The amount of boost of the booster chopper circuit (25a) may be varied by controlling the ratio of the ON-state period to the OFF-state period (i.e., the duty ratio) of each of the switching elements (Q25a, Q25b, Q25c). The duty ratio is controlled by the power factor correction driving section (30).

Note that the rest of the booster chopper circuit (25a) for the other two phases is connected in parallel with, and operates in the same way as, that part of the booster chopper circuit (25a) for one phase.

In addition, the number of elements in each set (such as the reactors (L25a, L25b, L25c)) of the power factor correction section (25) is only an example and does not have to be the exemplary one adopted in the example described above. Optionally, the PFC current (Ipfc) may be detected by a current sensor (not shown), instead of the resistors (R25a, R25b, R25c).

—Output Voltage Detecting Section—

The output voltage detecting section (27) detects a top voltage, an average voltage, and a bottom voltage of the output voltage (V2). As shown in FIGS. 1 and 4, the output voltage detecting section (27) includes, as its main components, two resistors (27a, 27b) which are connected together in series, and the controller (31) functioning as an output voltage sampling section (31c). The two resistors (27a, 27b) connected together in series are further connected in parallel with the smoothing capacitor (26) between the power factor correction section (25) and the power converting section (28). A voltage (V21) at the point of connection between these two resistors (27a, 27b) is input to the controller (31), sampled and A/D converted by the output voltage sampling section (31c) at every output-side detection period, and recognized as a result of detection (Vdc) of the output voltage (V2).

One output-side detection period is set to be shorter than one input-side detection period that is one detection period of the input voltage detecting section (24). For example, if one input-side detection period is approximately 1 sec., one output-side detection period may be approximately 10 msec.

—Power Converting Section—

The power converting section (28) is connected in parallel with the reactors (L25a, L25b, L25c) on the output side of the power factor correction section (25). When supplied with the output voltage (V2) by the power factor correction section (25), the power converting section (28) generates output AC power (SU, SV, SW).

Although not shown, the power converting section (28) is comprised of an inverter circuit and an inverter driving section. The inverter circuit is comprised of a plurality of power elements, which may be configured as insulated gate bipolar transistors, for example, and a plurality of freewheeling diodes, which are connected in parallel with the power elements. The inverter driving section may be configured as an integrated circuit, for example, and is connected to the respective gate terminals of the power elements. The inverter driving section turns ON and OFF the respective power elements by controlling the gate voltage applied to those power elements in accordance with a motor control signal (Pwm) output from the controller (31), thereby generating an output AC power (SU, SV, SW) in the inverter circuit.

—Current Detecting Section—

The current detecting section (29) detects the value of an input current (Im) for the power converting section (28). The input current (Im) refers herein to a current that flows from the commercial power supply (91) through the power line (41) and the power converting section (28) into the motor (11), and then flows through the power converting section (28) again and the GND line (42) into the power factor correction section (25).

As shown in FIGS. 1 and 4, the current detecting section (29) includes, as its main components, a shunt resistor (29a) connected in series to the GND line (42) and the controller (31) functioning as an input current calculating section (31d). The voltage (Vd2) between the two terminals of the shunt resistor (29a) is input to the controller (31), and sampled and A/D converted at every predetermined sampling period, and used to calculate the input current (Im), by the input current calculating section (31d).

—Power Factor Correction Driving Section—

The power factor correction driving section (30) is connected to the respective gate terminals of the switching elements (Q25a, Q25b, Q25c) and the controller (31). The power factor correction driving section (30) may be configured as an integrated circuit, for example. The power factor correction driving section (30) turns ON and OFF the power factor correction section (25) by controlling the gate voltage to be applied to the respective switching elements (Q25a, Q25b, Q25c) in accordance with a PFC drive instruction signal (Cpfc) supplied from the controller (31).

More specifically, the power factor correction driving section (30) outputs gate control signals (G1, G2, G3) to the respective switching elements (Q25a, Q25b, Q25c) in order to turn ON and OFF the respective switching elements (Q25a, Q25b, Q25c) repeatedly at short intervals while turning the power factor correction section (25) ON and making the correction section (25) perform a power factor correction operation. In this case, the power factor correction driving section (30) generates the gate control signals (G1, G2, G3) such that the current waveform becomes as close to a sinusoidal wave as possible (i.e., so as to correct the power factor and thereby reduce the harmonic component of the power supply current as much as possible).

Note that when making the power factor correction section (25) stop performing the power factor correction operation by turning the power factor correction section (25) OFF, the power factor correction driving section (30) outputs the gate control signals (G1, G2, G3) to keep all of these switching elements (Q25a, Q25b, Q25c) OFF to the respective switching elements (Q25a, Q25b, Q25c).

—Controller—

The controller (31) is comprised of a memory and a CPU. In accordance with various programs stored in the memory, the controller (31) functions as the input voltage sampling section (31a), the PFC current calculating section (31b), the output voltage sampling section (31c), the input current calculating section (31d), a motor driving control section (31e), a target value determining section (31f), and an amount of boost correcting section (31h) as shown in FIG. 4.

The motor driving control section (31e) determines a motor control signal (Pwm) in accordance with rotor position information of the motor (11) and outputs it to the inverter driving section of the power converting section (28). Examples of the rotor position information include a result of detection obtained by a Hall element in the motor (11), and the input current (Im) that is a result of detection obtained by the current detecting section (29). Also, while the motor (11) is being driven, the motor driving control section (31e) performs feedback control regarding the drive of the motor (11) based on the rotor position information, results of detection (Vac_peak, Vdc) obtained by the detecting sections (24, 27) at respective points in time, and other pieces of information.

In addition, the controller (31) according to the first embodiment further performs various types of control associated with the power factor correction section (25). Examples of those types of control include ON/OFF state control of the power factor correction section (25) while the motor (11) is rotating normally, and variable control of an output target value (Vdc_ref) that is a target value of the output voltage (V2) of the power factor correction section (25).

As used herein, the "ON/OFF state control of the power factor correction section (25) while the motor (11) is rotating normally" refers to the ON/OFF state control of the power factor correction section (25) based on the input current (Im) and other factors in a situation where no instantaneous voltage drop or power failure has occurred. According to this control, when the input current (Im) exceeds a first threshold value, the power factor correction section (25) turns ON. On the other hand, when the input current (Im) becomes lower than a second threshold value that is smaller than the first threshold value, the power factor correction section (25) turns OFF. Alternatively, according to this control, the control method using the input current (Im) may be replaced with a control method based on the magnitude of the output power of the power factor correction section (25) or a control method in which the power factor correction section (25) is turned ON as soon as the motor (11) is activated.

In the following description, the variable control of the output target value (Vdc_ref) and the ON/OFF state control to be performed on the power factor correction section (25) when either an instantaneous voltage drop or an instantaneous power failure occurs will be described in detail.

<Variable Control of Output Target Value>

This control is performed by the controller (31) functioning as the target value determining section (31f).

Figure 5:
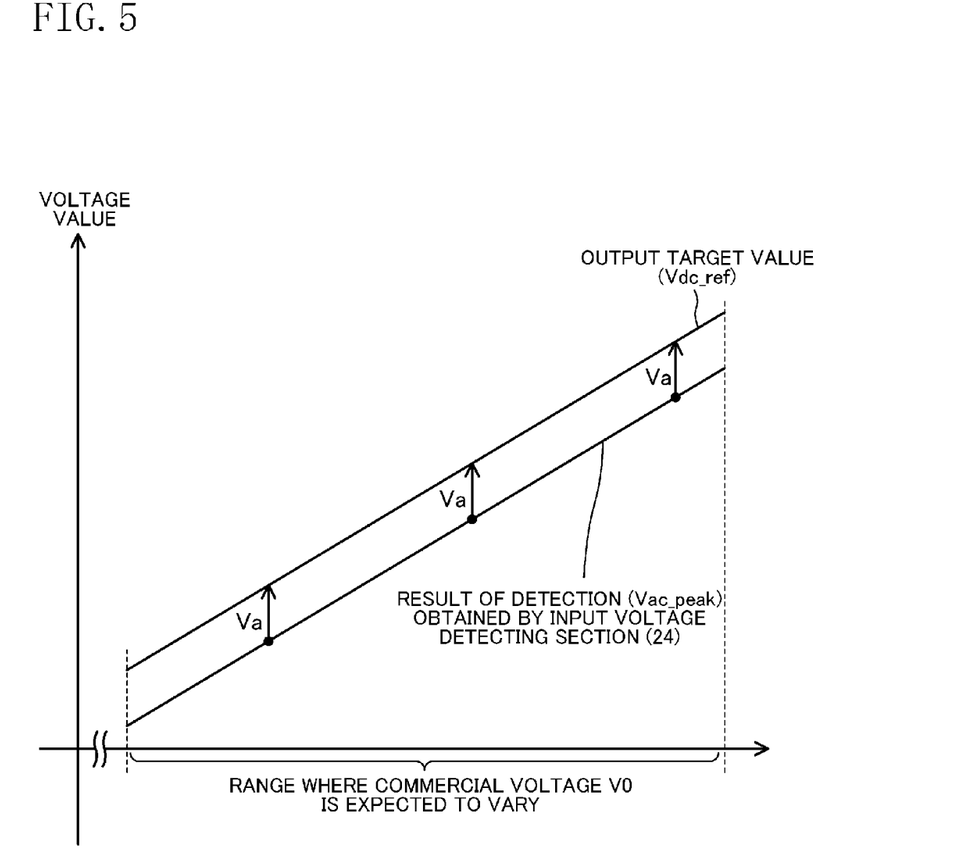
FIG. 5 illustrates the concept of a variable output target value according to the first embodiment.

FIG. 5 illustrates the concept of a variable output target value (Vdc_ref) according to the first embodiment. In FIG. 5, the abscissa indicates a range where the commercial voltage (V0) is expected to vary, and the ordinate indicates a result of detection (Vac_peak) obtained by the input voltage detecting section (24) with respect to the commercial voltage (V0) and the output target value (Vdc_ref). As can be seen from FIG. 5 and the following Equation (1), the target value determining section (310 determines the sum of a result of detection (Vac_peak) obtained by the input voltage detecting section (24) at each point in time and the amount of boost (Va) that is a constant quantity to be the output target value (Vdc_ref):

$$Vdc\_ref = Vac\_peak + Va \quad (1)$$

That is to say, FIG. 5 and this Equation (1) indicate that even if the input voltage (V1) of the power factor correction section (25) has changed, the output target value (Vdc_ref) is not always kept constant, but the output voltage (V2) of the power factor correction section (25) (i.e., the result of detection (Vdc)) changes with the input voltage (V1). Specifically, as shown in FIG. 5, as the commercial voltage (V0) falls, the result of detection (Vac_peak) obtained by the input voltage detecting section (24) also falls, and the output target value (Vdc_ref) comes to have a decreasing value accordingly. Conversely, as the commercial voltage (V0) rises, the result of detection (Vac_peak) obtained by the input voltage detecting section (24) also rises, and the output target value (Vdc_ref) comes to have an increasing value accordingly. Such variable control of the output target value (Vdc_ref) is effectively applicable to a situation where the commercial voltage (V0) varies, i.e., a situation where there is a variation in supply voltage.

The supply voltage varies due to various factors. For example, if multiple devices which are going to use the same commercial power supply (91) start to operate at a time, then a heavier load than a standard one will be placed on the installed capacity of the commercial power supply (91). In that case, the influence of the amount of current to flow from the commercial power supply (91) to the respective devices will be too much for the commercial power supply (91) to handle. As a result, the commercial voltage (V0) falls from the reference value. In another example, the supply voltage also varies in a situation where there are almost no devices operating. In that case, the load placed will be lighter than the standard one, which causes the commercial voltage (V0) to rise from the reference value.

Such a variation in supply voltage is sometimes just a temporary one, but sometimes a persistent one. When there is a variation in supply voltage, the commercial voltage (V0) may vary within the range of −10% to +10% with respect to the reference value.

If there arises such a variation in supply voltage, the result of detection (Vac_peak) obtained by the input voltage detecting section (24) also varies. For example, supposing the output voltage (V2) of the power factor correction section (25) is constant no matter whether there is a variation in supply voltage or not, if the commercial voltage (V0) has fallen to a level lower than the reference value, then the amount of boost of the power factor correction section (25) becomes higher than in a situation where the commercial voltage (V0) is as high as the reference value. In that case, the quantity of energy to be stored in the respective reactors (L25a, L25b, L25c) of the power factor correction section (25) increases, which thus involves an increase in the amount of current flowing through the reactors (L25a, L25b, L25c) and the switching elements (Q25a, Q25b, Q25c). As a result, the power loss caused by the reactors (L25a, L25b, L25c) and the switching elements (Q25a, Q25b, Q25c) increases.

Thus, as indicated by Equation (1) and as shown in FIG. 5, the target value determining section (31f) performs the control of determining the output target value (Vdc_ref) based on the result of detection (Vac_peak) obtained by the input voltage detecting section (24) with the amount of boost (Va) of the power factor correction section (25) set to be constant. As a result, even if there arises a variation in supply voltage, the amount of boost (Va) itself does not change, and therefore, the amount of current flowing through the switching elements (Q25a, Q25b, Q25c) becomes generally constant. Consequently, the power loss caused by the reactors (L25a, L25b, L25c) and switching elements (Q25a, Q25b, Q25c) that form the power factor correction section (25) becomes generally constant, too.

Optionally, the output target value may be a fixed value, too.

<Correction of Boost Rate>

In this embodiment, the amount of boost of the booster chopper circuit (25a) is supposed to be corrected such that the output voltage (V2) of the smoothing capacitor (26) does not become lower than the input voltage (V1) of the power factor correction section (25).

Figure 6:
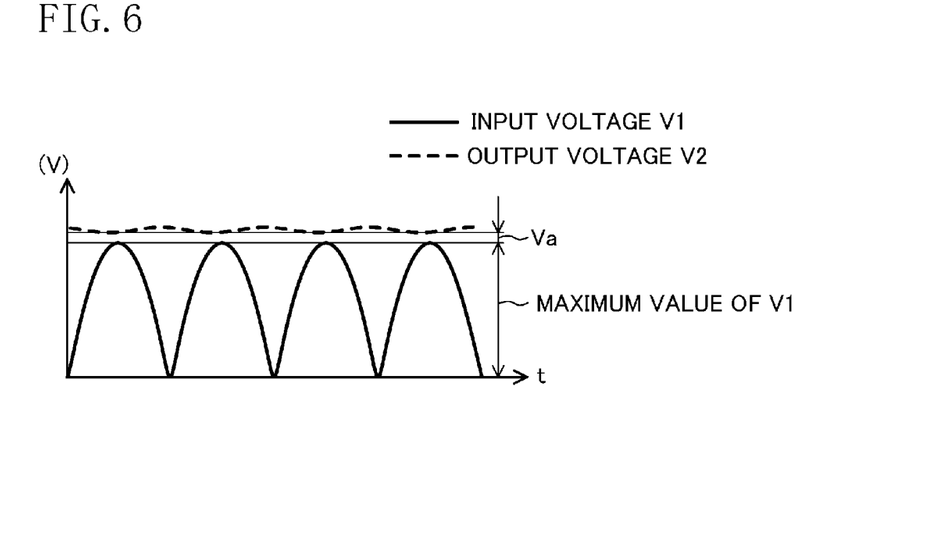
FIG. 6 shows how the waveforms of an input voltage and an output voltage of a smoothing capacitor change in a normal state.
Figure 7:
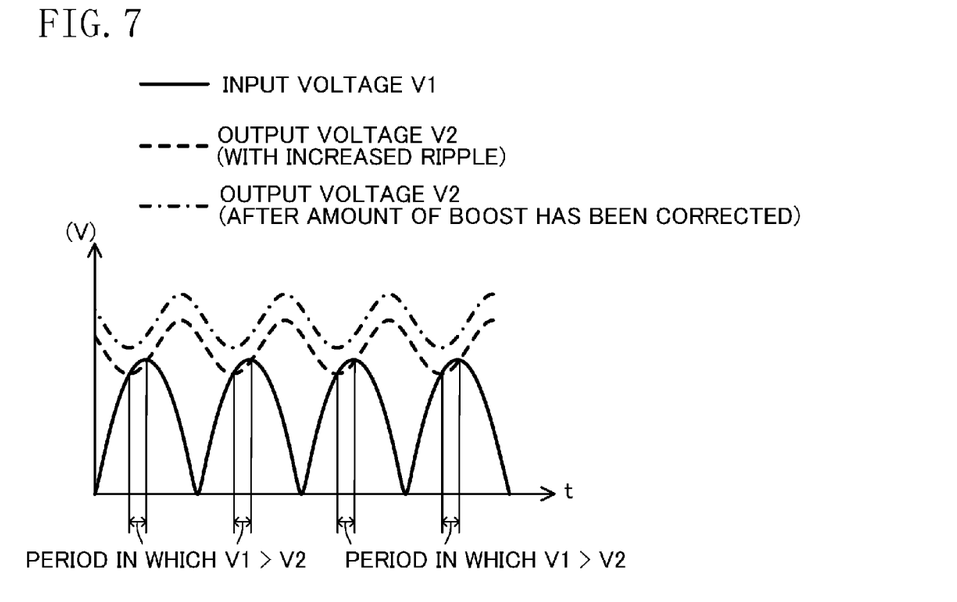
FIG. 7 shows how the waveform of an output voltage of the smoothing capacitor changes if the ripple has increased.

FIG. 6 shows the waveforms of the input voltage (V1) and the output voltage (V2) of the smoothing capacitor (26) in a normal state. As used herein, the "normal state" refers to a state where the load placed on the power factor correction section (25) falls within an expected range and where the degree of deterioration of the smoothing capacitor (26) falls within an expected range. In this case, the output voltage (V2) always has a larger value than the commercial voltage (V0). FIG. 7 shows the waveform of the output voltage (V2) of the smoothing capacitor (26) in a situation where the ripple has increased. In this example, the peak value (V11) of the output of the rectifier section (22) becomes larger than the bottom value of the output voltage (V2) of the smoothing capacitor (26).

Such an increase in ripple is a phenomenon observable when the smoothing capacitor (26) deteriorates or when the load placed on the power converting section (28) further increases. If the peak value (V11) of the input voltage (V1) of the power factor correction section (25) becomes larger than the bottom value of the output voltage (V2) of the smoothing capacitor (26) as described above, the boosting operation may be performed intermittently in the power factor correction section (25). In that case, in a conventional device, the harmonic component of the supply current may increase, the power factor may be corrected insufficiently, or a large amount of transient current may flow through the switching elements that form the power factor correction section.

According to this embodiment, however, the correction described above is made such that even if the ripple has increased in this manner, the output voltage (V2) of the smoothing capacitor (26) does not become lower than the input voltage (V1) of the power factor correction section (25). In this embodiment, this correction is controlled by the controller (31) functioning as an amount of boost correcting section (31h).

Specifically, the amount of boost correcting section (31h) monitors the output value (i.e., the voltage (V21)) of the output voltage detecting section (27) at every predetermined period. The voltage (V21) corresponds to (i.e., is correlated to) the output voltage (V2) of the smoothing capacitor (26). Then, the amount of boost correcting section (31h) calculates the ripple amplitude of the output voltage (V2) of the smoothing capacitor (26) based on this voltage (V21). If the ripple amplitude of the output voltage (V2) of the smoothing capacitor (26) turns out to be greater than a predetermined threshold value (C_Vripple_Dat), the amount of boost correcting section (31h) increases the amount of boost of the booster chopper circuit (25a). More specifically, the amount of boost correcting section (31h) sets the sum of the amount of boost (Va) in the normal state and a constant increment (which will be hereinafter referred to as a "voltage correction value (C_Vdc_Add)") to be a new amount of boost. That is to say, the new amount of boost is Va+C_Vdc_Add. Once the new amount of boost is determined, the controller (31) instructs the motor driving control section (31e) to switch the switching elements (Q25a, Q25b, Q25c) of the booster chopper circuit (25a) at the duty ratio of the booster chopper circuit (25a).

The threshold value (C_Vripple_Dat) and voltage correction value (C_Vdc_Add) are set with the ripple to be caused when the load becomes maximum and the ripple to be caused when the smoothing capacitor (26) deteriorates taken into consideration such that the output voltage (V2) of the smoothing capacitor (26) does not become lower than the input voltage (V1) even in those situations. In this embodiment, the threshold value (C_Vripple_Dat) is 30 V and the increment of the amount of boost (i.e., the voltage correction value (C_Vdc_Add)) is 5 V (which is a fixed value). Naturally, these values are just exemplary ones and may be set appropriately depending on the intended use of the power converter (20) and other factors.

Note that it does not mean that the greater the voltage correction value (C_Vdc_Add), the better. This is because if the amount of boost is too high, the loss caused by the switching elements (Q25a, Q25b, Q25c) increases. That is to say, when the voltage correction value (C_Vdc_Add) is determined, the loss caused by the switching elements (Q25a, Q25b, Q25c) also needs to be taken into consideration.

By increasing the amount of boost as described above, the ripple itself does not decrease, but the bottom of the output voltage (V2) of the smoothing capacitor (26) does not become lower than the input voltage (V1) after the correction, as shown in FIG. 7.

Nevertheless, if the load placed on the power converting section (28) has increased temporarily to cause an increase in the ripple of the output voltage (V2) of the smoothing capacitor (26), for example, then the ripple decreases as the load decreases. It is not recommended that the amount of boost be left corrected (i.e., be kept an increased one) in such a situation, because the loss would increase in that case. Thus, according to this embodiment, if the ripple amplitude of the output voltage (V2) of the smoothing capacitor (26) has become smaller than the predetermined threshold value (C_Vripple_Rel) after the correction has been made, the amount of boost correcting section (31h) lowers the amount of boost to cancel the correction. In this embodiment, the threshold value (C_Vripple_Rel) at which the correction is canceled is 25 V. Naturally, this value is also only an exemplary one, and may be set appropriately according to the intended use of the power converter (20).

Advantages of this Embodiment

As can be seen from the foregoing description, according to this embodiment, if the ripple of the smoothing capacitor (26) has increased, the amount of boost of the booster chopper circuit (25a) is corrected. Thus, according to this embodiment, the power factor correction section (25) may be prevented from starting the intermittent operation if the ripple has increased. That is to say, according to this embodiment, the harmonic component of the supply current may be prevented from increasing, the power factor may be prevented from being corrected insufficiently, and a large amount of transient current may be prevented from flowing through the switching elements (Q25a, Q25b, Q25c) that form the power factor correction section (25).

Second Embodiment of this Invention

Another exemplary configuration for the amount of boost correcting section (31h) will be described as a second embodiment of the present invention. The amount of boost correcting section (31h) of this embodiment is configured to correct the amount of boost of the booster chopper circuit (25a) such that the detection value of the output voltage detecting section (27) does not become lower than that of the input voltage detecting section (24).

In this example, the amount of boost correcting section (31h) monitors the detection value of the input voltage detecting section (24) periodically. The amount of boost correcting section (31h) is configured to increase (correct) the amount of boost of the booster chopper circuit (25a) when the result of detection (Vdc) obtained by the output voltage detecting section (27) becomes sufficiently close to the result of detection (Vac_peak) obtained by the input voltage detecting section (24).

For example, as the ripple amplitude of the output voltage (V2) of the smoothing capacitor (26) increases, the peak value (V11) of the output of the rectifier section (22) becomes closer to the bottom value of the output voltage (V2) of the smoothing capacitor (26). According to this embodiment, however, the amount of boost of the booster chopper circuit (25a) is increased in such a situation. Thus, according to this embodiment, the peak value (V11) may also be prevented from exceeding the bottom value of the output voltage (V2) of the smoothing capacitor (26). Consequently, according to this embodiment, the power factor correction section (25) may also be prevented from starting the intermittent operation if the ripple has increased. That is to say, according to this embodiment, the harmonic component of the supply current may be prevented from increasing, the power factor may be prevented from being corrected insufficiently, and a large amount of transient current may be prevented from flowing through the switching elements (Q25a, Q25b, Q25c) that form the power factor correction section (25).

Other Embodiments

Note that the target to be driven by the motor (11) does not have to be the compressor (72) but may also be the outdoor fan (76) or the indoor fan (82), for example.

Optionally, a rectifier circuit connected to the commercial power supply (91) may be provided separately from the rectifier section (22), and the input voltage detecting section (24) may be configured to detect the output voltage of that rectifier circuit.

Also, when the amount of boost is corrected, the magnitude of the correction may be increased stepwise with the relationship between the bottom of the output voltage (V2) of the smoothing capacitor (26) and the input voltage (V1) monitored. This allows for cutting down the loss caused by the power converter without increasing the amount of boost unnecessarily. Specifically, the operation of monitoring the output value (i.e., the voltage (V21)) of the output voltage detecting section (27) after the amount of boost has been corrected to a predetermined degree and further increasing the amount of boost if the bottom of the output voltage (V2) of the smoothing capacitor (26) is still lower than the input voltage (V1) may be continued until the bottom of the output voltage (V2) of the smoothing capacitor (26) exceeds the input voltage (V1).

It is recommended that the initial value of the amount of boost (i.e., the value yet to be corrected) be set to be as low as possible, because the loss to be caused by the power converter may be reduced in that case. The initial value may be determined based on the current load, for example.

INDUSTRIAL APPLICABILITY

The present invention relates to a power converter with a boost power factor correction section, and more particularly is useful as a technique for stabilizing the power factor correction to be made by the power factor correction section.

DESCRIPTION OF REFERENCE CHARACTERS

20 Power Converter
22 Rectifier Section
24 Input Voltage Detecting Section
25 Power Factor Correction Section
25a Booster Chopper Circuit (Booster Circuit)
26 Smoothing Capacitor
27 Output Voltage Detecting Section
28 Power Converting Section
30 Power Factor Correction Driving Section (Control Section)
31 Controller (Control Section)
70 Air Conditioner
91 Commercial Power Supply (AC Power Supply)
100 Motor Driving System
V1 Input Voltage
V2 Output Voltage
V11 Peak Value

The invention claimed is:
1. A power converter comprising:
a rectifier configured to rectify an incoming alternating current that has come from an AC power supply;
a power factor corrector including a booster circuit configured to have a variable amount of boost and to boost an input voltage supplied from the rectifier and a smoothing capacitor configured to smooth an output of the booster circuit;
a power converter connected to an output of the power factor corrector and generating an output AC power; and
a controller configured to correct a power factor by controlling the amount of boost of the booster circuit to make an output voltage of the smoothing capacitor not lower than the input voltage supplied from the rectifier.

2. The power converter of claim 1, wherein the controller makes the correction if the output voltage of the smoothing capacitor has a ripple exceeding a predetermined threshold value (C_Vripple_Dat).

3. The power converter of claim 2, comprising
an output voltage detector configured to detect the output voltage, wherein
the controller makes the correction if the output voltage has an amplitude exceeding the threshold value (C_Vripple_Dat).

4. The power converter of claim 3, wherein the controller decreases the amount of boost if the amplitude of the ripple of the output voltage of the smoothing capacitor becomes smaller than a predetermined threshold value (C_Vripple_Rel) after the correction has been made.

5. The power converter of claim 4, wherein the controller increases the amount of boost of the booster circuit stepwise such that the output voltage of the smoothing capacitor does not become lower than the input voltage.

6. The power converter of claim 3, wherein the controller increases the amount of boost of the booster circuit stepwise such that the output voltage of the smoothing capacitor does not become lower than the input voltage.

7. An air conditioner comprising the power converter of claim 3.

8. The power converter of claim 2, wherein the controller decreases the amount of boost if the amplitude of the ripple of the output voltage of the smoothing capacitor becomes smaller than a predetermined threshold value (C_Vripple_Rel) after the correction has been made.

9. The power converter of claim 8, wherein the controller increases the amount of boost of the booster circuit stepwise such that the output voltage of the smoothing capacitor does not become lower than the input voltage.

10. The power converter of claim 2, wherein the controller increases the amount of boost of the booster circuit stepwise such that the output voltage of the smoothing capacitor does not become lower than the input voltage.

11. An air conditioner comprising the power converter of claim 2.

12. The power converter of claim 1, comprising:
an input voltage detector configured to detect a peak value of the input voltage; and
an output voltage detector configured to detect the output voltage, wherein the controller makes the correction such that a bottom voltage detected by the output voltage detector does not become lower than a voltage (Vac_peak) detected by the input voltage detector.

13. The power converter of claim 12, wherein the controller decreases the amount of boost if the amplitude of the ripple of the output voltage of the smoothing capacitor becomes smaller than a predetermined threshold value after the correction has been made.

14. The power converter of claim 13, wherein the controller increases the amount of boost of the booster circuit stepwise such that the output voltage of the smoothing capacitor does not become lower than the input voltage.

15. The power converter of claim 12, wherein the controller increases the amount of boost of the booster circuit stepwise such that the output voltage of the smoothing capacitor does not become lower than the input voltage.

16. An air conditioner comprising the power converter of claim 12.

17. The power converter of claim 1, wherein the controller decreases the amount of boost if the amplitude of the ripple of the output voltage of the smoothing capacitor becomes smaller than a predetermined threshold value (C_Vripple_Rel) after the correction has been made.

18. The power converter of claim 17, wherein the controller increases the amount of boost of the booster circuit stepwise such that the output voltage of the smoothing capacitor does not become lower than the input voltage.

19. The power converter of claim 1, wherein the controller increases the amount of boost of the booster circuit stepwise such that the output voltage of the smoothing capacitor does not become lower than the input voltage.

20. An air conditioner comprising the power converter of claim 1.

* * * * *